May 26, 1925.
C. S. JOHNSTON
1,539,741
VEHICLE WHEEL
Filed Aug. 25, 1919
2 Sheets-Sheet 1
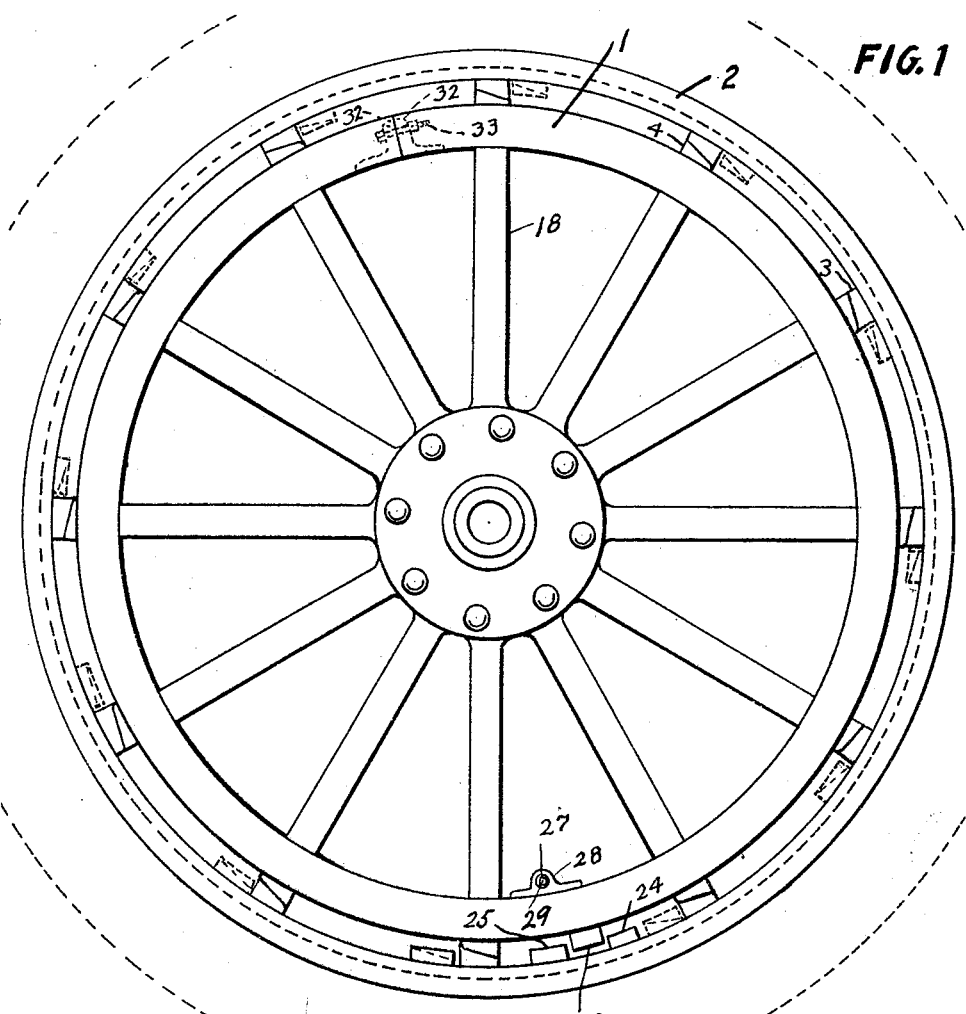
FIG.1
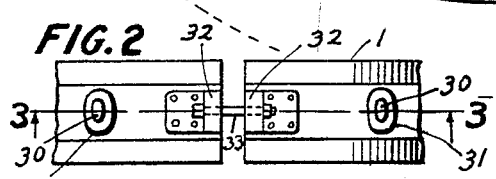
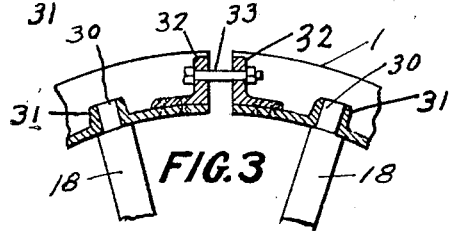
INVENTOR
CLARENCE S. JOHNSTON
BY
HIS ATTORNEYS.

May 26, 1925.
C. S. JOHNSTON
1,539,741
VEHICLE WHEEL
Filed Aug. 25, 1919
2 Sheets-Sheet 2
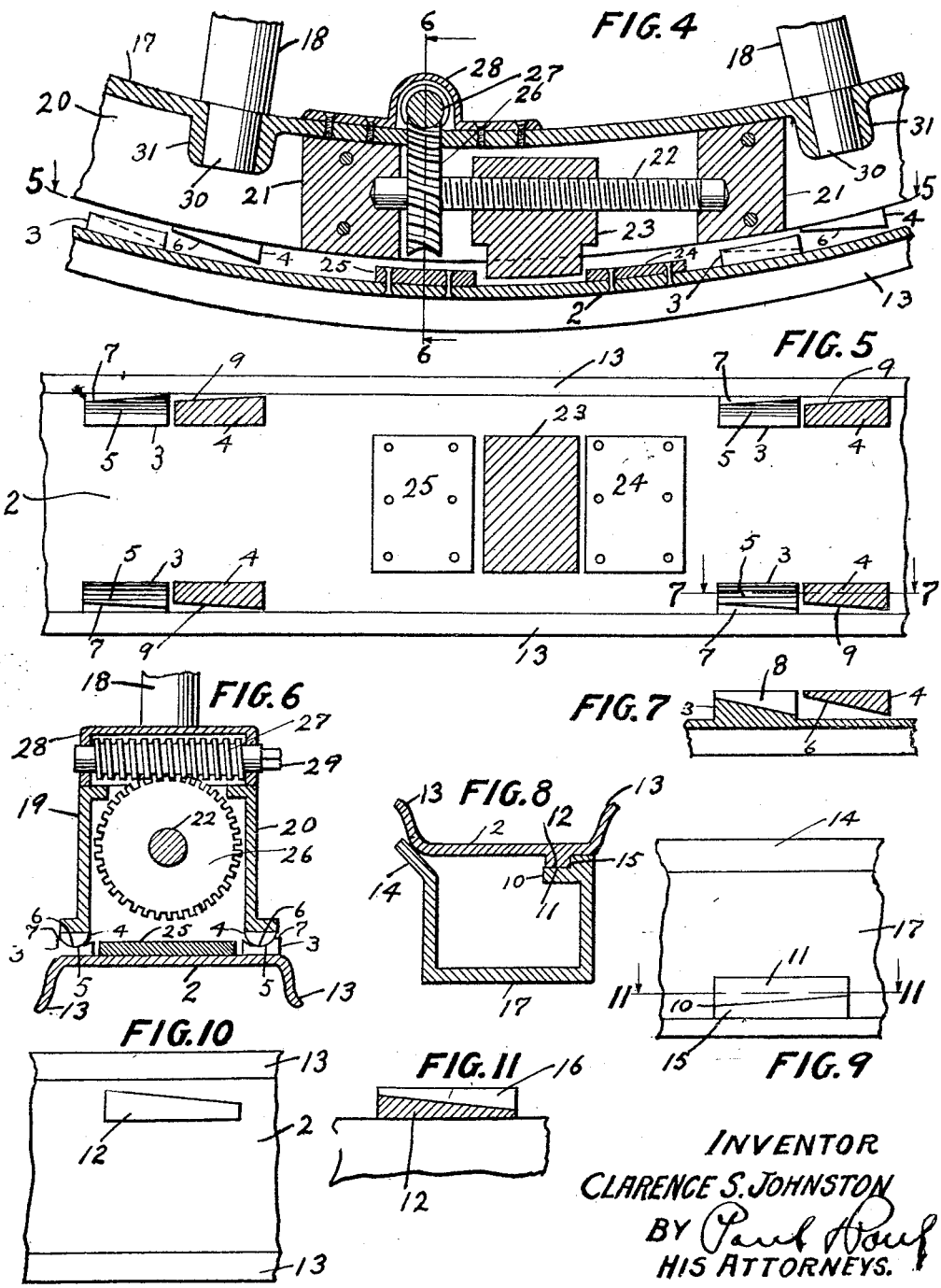
INVENTOR
CLARENCE S. JOHNSTON
BY Paul Paul
HIS ATTORNEYS.

Patented May 26, 1925.

1,539,741

UNITED STATES PATENT OFFICE.

CLARENCE S. JOHNSTON, OF GLENDIVE, MONTANA.

VEHICLE WHEEL.

Application filed August 25, 1919. Serial No. 319,775.

*To all whom it may concern:*

Be it known that I, CLARENCE S. JOHNSTON, citizen of the United States, resident of Glendive, Dawson County, Montana, have invented certain new and useful Improvements in Vehicle Wheels, of which the following is a specification.

This invention relates to improvements in vehicle wheels of the type employing what are generally known as demountable rims. It provides a novel and improved construction in which the rim may be easily mounted on the wheel body and held in secure position thereon during use, and may be released and easily demounted without disturbing the tire, usually pneumatic, which is secured to the rim.

In vehicle wheels of this type it is old to provide demountable rims which are movable with relation to the wheel body and are thereby moved into and out of locking engagement with the wheel through interengaging means on the rim and wheel body. Such function has been achieved by means of projections on one member and a recess in the other member, the recess being inclined radially so that, when the rim is moved circumferentially of the wheel body, there is a resultant radial motion of the rim as the projection rides up the inclined surface which motion functions to retain the rim in frictional locking engagement on the wheel body.

This improved structure provides a transversely locking engagement of the rim and also a combination of the transverse and radial locking engagements. It also provides an improved mechanism for moving the rim with relation to the wheel body by which movement the locking functions are effected.

An object of the invention, therefore, is to provide an improved demountable rim and vehicle wheel.

Another object is to provide an improved means for locking or securing the rim to the wheel body.

Another object is to provide an improved means for causing relative movement between the rim and wheel body.

Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow.

In the drawings:

Figure 1 is a view in elevation of a wheel having the novel demountable rim secured thereto;

Figure 2 is a detail of the felly locking mechanism;

Figure 3 is a section on the line 3—3 of Figure 2;

Figure 4 is a sectional view of the device for moving the rim relatively to the wheel body;

Figure 5 is a section on the line 5—5 of Figure 4;

Figure 6 is a section on the line 6—6 of Figure 4;

Figure 7 is a section on the line 7—7 of Figure 5;

Figure 8 is a sectional view of a different form of the interengaging means provided on the rim and wheel body;

Figure 9 is a plan view of the felly lug shown in Figure 8;

Figure 10 is a plan view of the form of rim lug shown in Figure 8;

Figure 11 is a section on the line 11—11 of Figure 9.

In the selected embodiment of this invention, a vehicle wheel 1 is provided with a demountable rim 2 circumscribing the wheel body. Means are provided on the wheel body and on the rim which coact radially and transversely to secure the rim to the wheel body in locked, wedged or frictional engagement when the rim is moved relatively to the wheel body.

In referring to the movements of the rim with relation to the wheel body three directions or movements may be considered; the circumferential movement of the rim, i. e., when the rim is revolved on the periphery of the wheel body about the axis of the wheel; the radial movement of the rim, i. e. when any point on the rim is moved to a greater or less radial distance from the hub or center of the wheel; and the transverse movement of the rim, i. e. when the rim is moved in either direction of the axis of the hub of the wheel.

In the selected embodiment of this invention the rim and wheel body are provided with interengaging lugs which project from the respective peripheries of these two members. The lugs on one member are preferably concaved to receive a complementary convexed surface provided by the lug on the other member; and, while the disposition of the lugs may be reversed it is deemed preferable to provide the concaved lugs 3 on the rim 2 while the convexed lugs 4 are provided on the wheel body 1. The lugs on each member are preferably arranged in pairs although in the preferred form here disclosed they are singly employed but with the cooperation of another element which assumes the function of the complementary lug.

As shown in Figures 6 and 7 the complementary pairs of rim lugs 3 are substantially oblong in shape and are longitudinally grooved to provide a concave surface 5. They are preferably formed integral with the rim as shown, and project inwardly. The height of the individual rim lug above the rim periphery is less at the end at which it engages the wheel lug than it is at the opposite end, thus making the working surface of each rim lug longitudinally inclined. In other words, the working surface of each rim lug is substantially slightly tangential to the rim periphery. Each wheel lug 4 is preferably integrally formed with the wheel body with its convexed working surface 6 similarly inclined to the wheel body periphery. Hence, as the rim is moved relatively to the wheel, the reversedly tangential surfaces of the opposed pairs of interengaging rim and wheel lugs coact radially to force the rim radially. As the rim is susceptible of only a relatively slight radial expansion, this movement functions to hold the rim on the wheel body in locked frictional engagement.

In this selected embodiment these opposed pairs of locking lugs also coact transversely. To this end, each rim lug is provided on its outer side with a wall 7 projecting beyond the lug groove. The inside, or working, faces 8 of the walls of each pair of complementary rim lugs are inclined to the plane of the rim and are convergent. These convergent faces are adapted to engage the outside faces 9 of their opposed wheel lugs so that, as the rim lugs move over the convexed lugs, these rim and wheel lug faces coact transversely to secure a transversely wedging or frictional locking engagement of the rim and wheel. In order that greater area of engagement may be attained between the outside faces 9 of each projecting wheel lug and the inside wall face 8 of its opposed rim lug, the outside face 9 of each wheel lug is inclined to the plane of the wheel. The outside faces 9 of a complementary pair of wheel lugs are divergently inclined. They are, therefore, reversedly inclined with relation to the inclination of the inside faces 8 of their opposed rim lugs. Therefore, as is likewise the case with the opposedly coacting tangential surfaces of these lugs, engagement of substantially the whole of the opposed faces is attained before the radial or transverse coaction takes place. This is preferable to attaining this coaction through the engagement of relatively small interengaging lug areas as it provides greater strength, durability and security to the frictional or wedging locking engagement of the rim and wheel body.

The preferred form of effecting transverse coaction is shown in Figures 8 to 11, inclusive. As there shown, the use of pairs of lugs is dispensed with and the lugs constitute a single series on each opposed transverse side of the rim and wheel body. The transverse coaction, as well as the radial coaction being attained by continuous shoulders or flanges on the rim and body which elements assume the function of the respective complementary lugs.

In this form, each lug 10 of the wheel body series is disclosed as having a plane, inclined or substantially slightly tangential, working face 11 engageable by a similar but reversedly inclined face of the opposed rim lug 12. The coaction of these interengageably working surfaces of the rim and wheel lugs provides the radial locking function. These series of opposed lugs are on one peripheral side of the wheel body. The rim, however, in both forms, is provided with an outwardly flaring annular flange 13 on each transverse side. An outwardly annular flange 14 is formed on the other side of the periphery of the wheel body from the series of body lugs. When the rim is mounted on the wheel and moved relatively thereto, the rim flange 13 annularly engages the body flange 14, and the opposed lugs radially coact to lock the rim in position.

While the lugs of this single annular series may only have the substantially tangentially inclined contacting surfaces, they are preferably also provided with the inclined surfaces which cooperatively function transversely.

This preferred form of body lug 11 is formed on its outer side with a longitudinally projecting wall 15 which provides an inside, or working, face 16 inclined to the plane of the wheel body. The outside face of the opposed rim lug 12 is similarly but reversedly inclined so that, as these rim lugs move over these wheel lugs, the opposed lugs transversely coact. When the rim is transversely mounted and moved with relation to the wheel body, the rim is transversely moved and the rim flange may ride slightly up and outwardly on the wheel flange until rim and wheel are held in locked engagement. And, similarly, when the rim is reversedly moved with relation to the wheel body, the rim is transversely moved toward the lug side of the wheel body when it may be easily and quickly demounted.

There is also provided in the improved structure, a novel mechanism for causing relative movement between the rim and the wheel body. This mechanism is carried by the wheel body, preferably by a felly of a novel type, which affords an enclosure to cover and thus to protect the parts of the mechanism in their otherwise exposed position. Being adjacent the wheel periphery, there is exposure to water, mud, stones and similar objects when the wheel is in use.

In this selected form, a hollow metallic felly is used. This is preferably a three-sided or channel felly. This felly has a base 17 which is outwardly presented and which receives the spokes 18. It has two radially projecting sides 19 and 20. Suitable transverse supports 21 are secured to the sides of the felly and these supports provide bearings for the screw 22 rotatably mounted within the felly at each end in one of said supports. This screw bears a rim-engaging element thereon which is shown as a block 23 apertured to receive the screw 22 in threaded engagement. Upon rotation of the screw in its relatively fixed bearings 21, the block, unable to rotate therewith, must travel longitudinally of the screw in either direction depending upon the clockwise or counter-clockwise rotation of the screws. The lower portion of this block preferably is reduced and is adapted to be positioned between, and singly to engage, the two plates 24 and 25 secured in spaced relation to the inner annular face of the rim. Movement of the block 23 in either direction is thereby communicated to the rim and relative movement of rim and wheel body attained. The screw 22 is actuable by means of a worm-wheel 26 secured to, and rotatable with, the screw. This worm-wheel is in mesh with a worm 27 rotatably borne in a bearing plate 28 secured to the hub side of the wheel felly. One end 29 of this worm projects through the plate 28 and is angularly shaped to be readily engaged by any suitable instrument for rotating this worm. This rotation of the worm in one direction causes the rim to be moved circumferentially of the felly or wheel body so that the coacting means on the rim and body cause the rim to move, radially or radially and transversely in accordance with the formation of the particular lugs employed, into locked engagement with the wheel body. A rotation of the worm in the opposite direction functions to release the rim.

A novel means is provided in this novel wheel for securely retaining the spokes of the wheel in position. Each spoke 18 connected to the central portion of the wheel bears a terminally reduced portion 30. The felly base 17 is suitably apertured and each aperture is provided with an annular shoulder 31. These shoulders are preferably integral with the felly and project from the base 17 within the felly channel. Each spoke reduced portion is received through an aperture and fitted in the shouldered portion. The felly is split and each end bears an L-shaped member or bracket secured to the felly base. The projecting portion 32 of each bracket is apertured to receive a tightening rod 33. One end of this rod may be enlarged so that it cannot pass through one aperture or may bear a nut thereon for the same purpose, the other end being threaded to engage a nut. The turning of this latter nut thus functions to draw together the two felly ends and thus to cause the spokes to be held in tight frictional engagement with their respective aperture sides and shoulders.

By the employment of this embodiment of felly not only may the spokes be tightly adjustably held, the rim moving mechanism protected, but also the lugs, or rim engaging means, may be positioned, preferably integrally formed, on one or both peripheral faces of the outwardly projecting channel sides.

Having thus described my invention what I claim as new and desire to secure by Letters Patent, is:

1. A wheel having in combination, a wheel body, a rim circumscribing the body, the rim and the body having means which coact when the rim is moved relatively to the body to cause the rim to move radially and circumferentially, a screw rotatably secured in said body, a rim-engaging element mounted thereon in threaded engagement, and means for rotating said screw whereby the rim is moved relatively to said body.

2. A wheel having in combination, a wheel body, a rim circumscribing the body, the rim and the body having means which coact when the rim is moved relatively to the body to cause the rim to move radially and circumferentially, a screw rotatably secured in said body, a rim-engaging element mounted thereon in threaded engagement, a worm-wheel on said screw and rotatable therewith, and a worm to actuate said worm-wheel whereby the rim is moved relatively to said body.

3. A wheel having in combination, a central portion, a channeled felly having its base toward the central portion and its sides projecting outwardly therefrom, means within said channel to move the rim relatively to the felly, a rim circumscribing the felly, and means on said rim and on the peripheral portion of a felly side which coact when the rim is moved relatively to the felly to cause the rim to be secured to said felly.

In witness whereof, I have hereunto set my hand this 6th day of August, 1919.

CLARENCE S. JOHNSTON.